US006977925B2

(12) United States Patent
Pittman

(10) Patent No.: US 6,977,925 B2
(45) Date of Patent: Dec. 20, 2005

(54) FOLDED FABRIC SWITCHING ARCHITECTURE

(75) Inventor: David Allen Pittman, Terrell, TX (US)

(73) Assignee: Cesura, Inc., Austin, TX (US)

( * ) Notice: Subject to any disclaimer, the term of this patent is extended or adjusted under 35 U.S.C. 154(b) by 1024 days.

(21) Appl. No.: 09/824,459

(22) Filed: Apr. 2, 2001

(65) Prior Publication Data

US 2002/0141396 A1 Oct. 3, 2002

Related U.S. Application Data

(60) Provisional application No. 60/223,675, filed on Aug. 8, 2000.

(51) Int. Cl.[7] .......................... H04L 12/50; H04L 12/28
(52) U.S. Cl. ...................... 370/359; 370/257; 370/412; 370/471; 710/305
(58) Field of Search .............................. 370/253, 351, 370/359, 360, 377, 389, 392, 401, 412, 442, 370/471, 369, 257; 709/244; 710/305, 317

(56) References Cited

U.S. PATENT DOCUMENTS

| 4,711,024 | A | * | 12/1987 | Russell ........................ 29/832 |
| 5,557,607 | A | * | 9/1996 | Holden ........................ 370/413 |
| 5,689,506 | A | * | 11/1997 | Chiussi et al. .............. 370/388 |
| 5,856,977 | A | * | 1/1999 | Yang et al. ............ 370/395.72 |
| 6,847,608 | B1 | * | 1/2005 | Soo et al. .................... 370/228 |

* cited by examiner

Primary Examiner—Afsar Qureshi
(74) Attorney, Agent, or Firm—Toler, Larson & Abel, LLP

(57) ABSTRACT

An optimal printed circuit board input/output switching system is provided and includes a printed circuit board having multiple input/output ports with communication channels coupling the input/output ports to a switching fabric located thereon. Two printed circuit boards may be connected with a board connector for providing switching between input/output ports of the printed circuit boards in a dual-board switching system. The switching fabrics of each printed circuit board can function as an aggregate switching fabric to provide communication channel switching between the input/output ports of the two printed circuit boards. A dual-board switching system may include a single printed circuit board having the switching fabric located thereon. A board connector facilitates modification of the switching configuration. Connection of the two circuit boards provides a coplanar arrangement of the input/output ports of the printed circuit boards providing access thereto from a common plane of a switching system chassis.

20 Claims, 5 Drawing Sheets

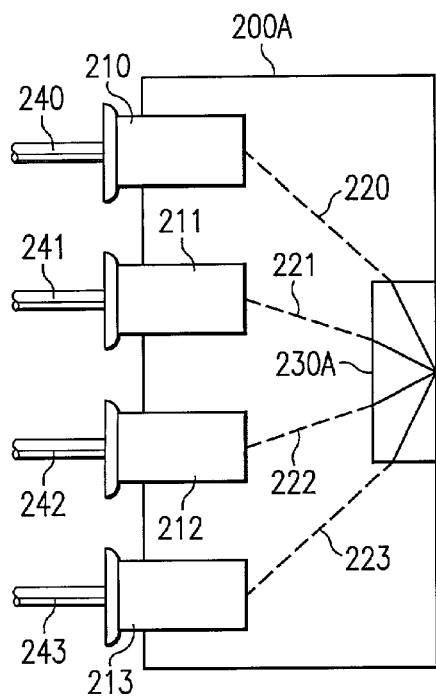
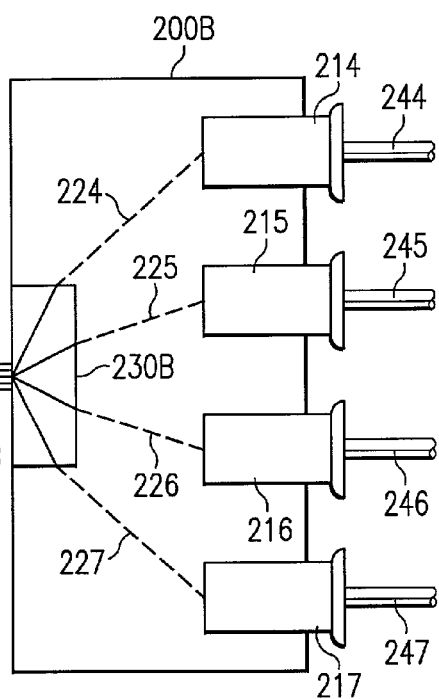
FIG. 3
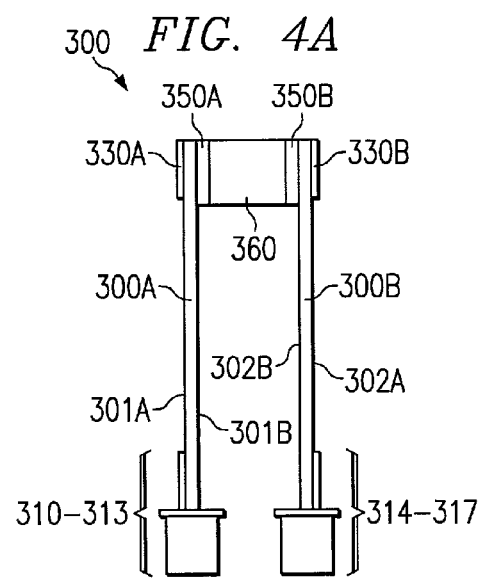
FIG. 4A
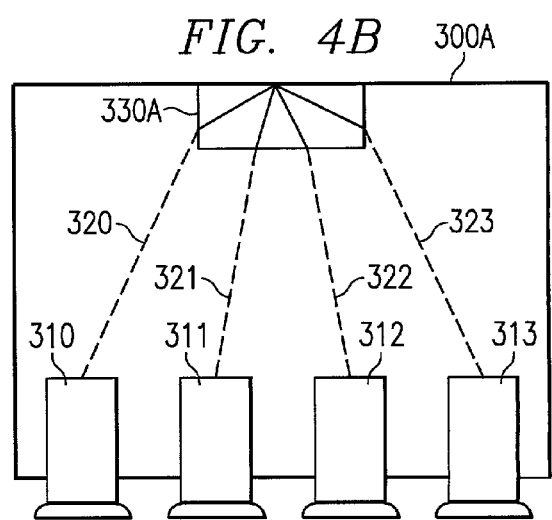
FIG. 4B

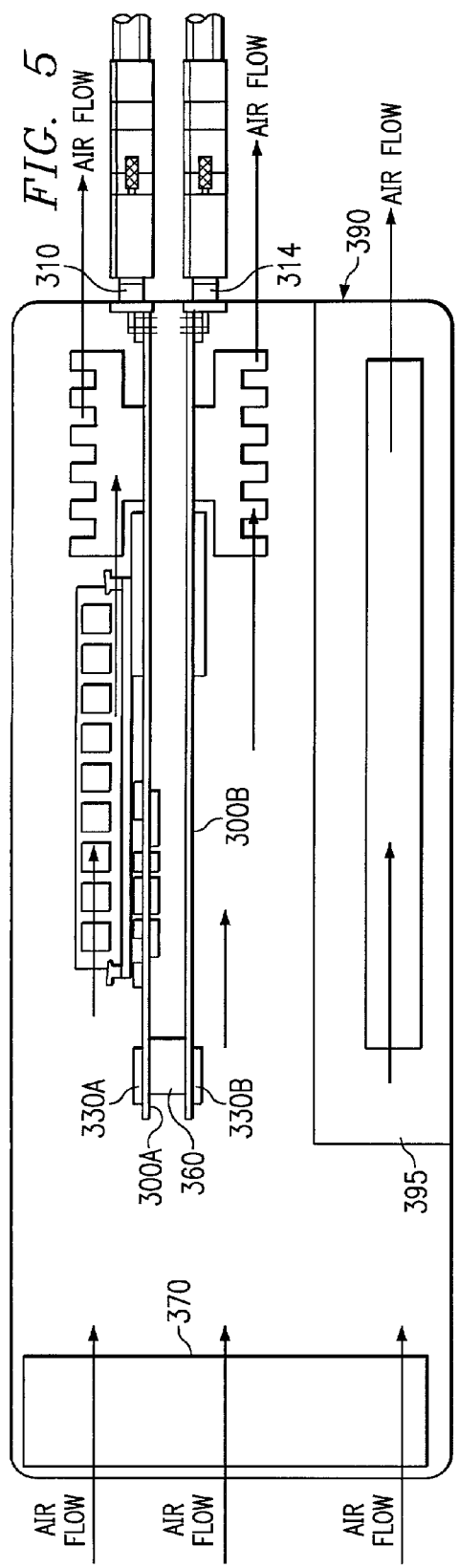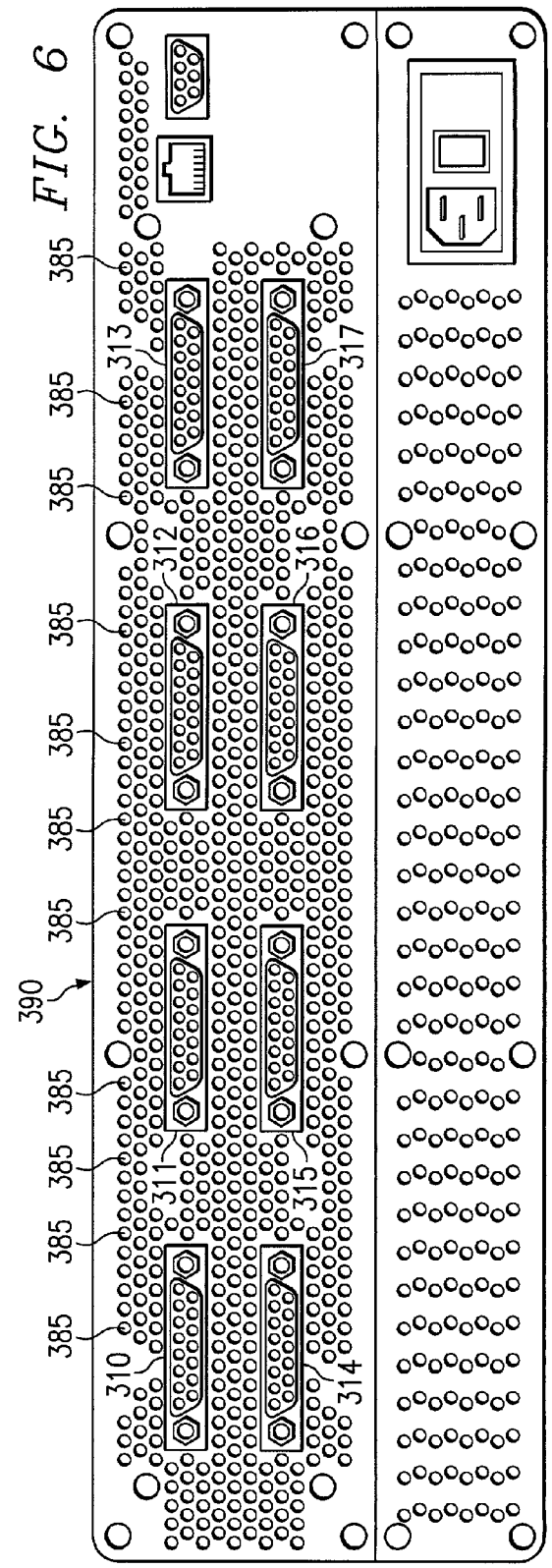

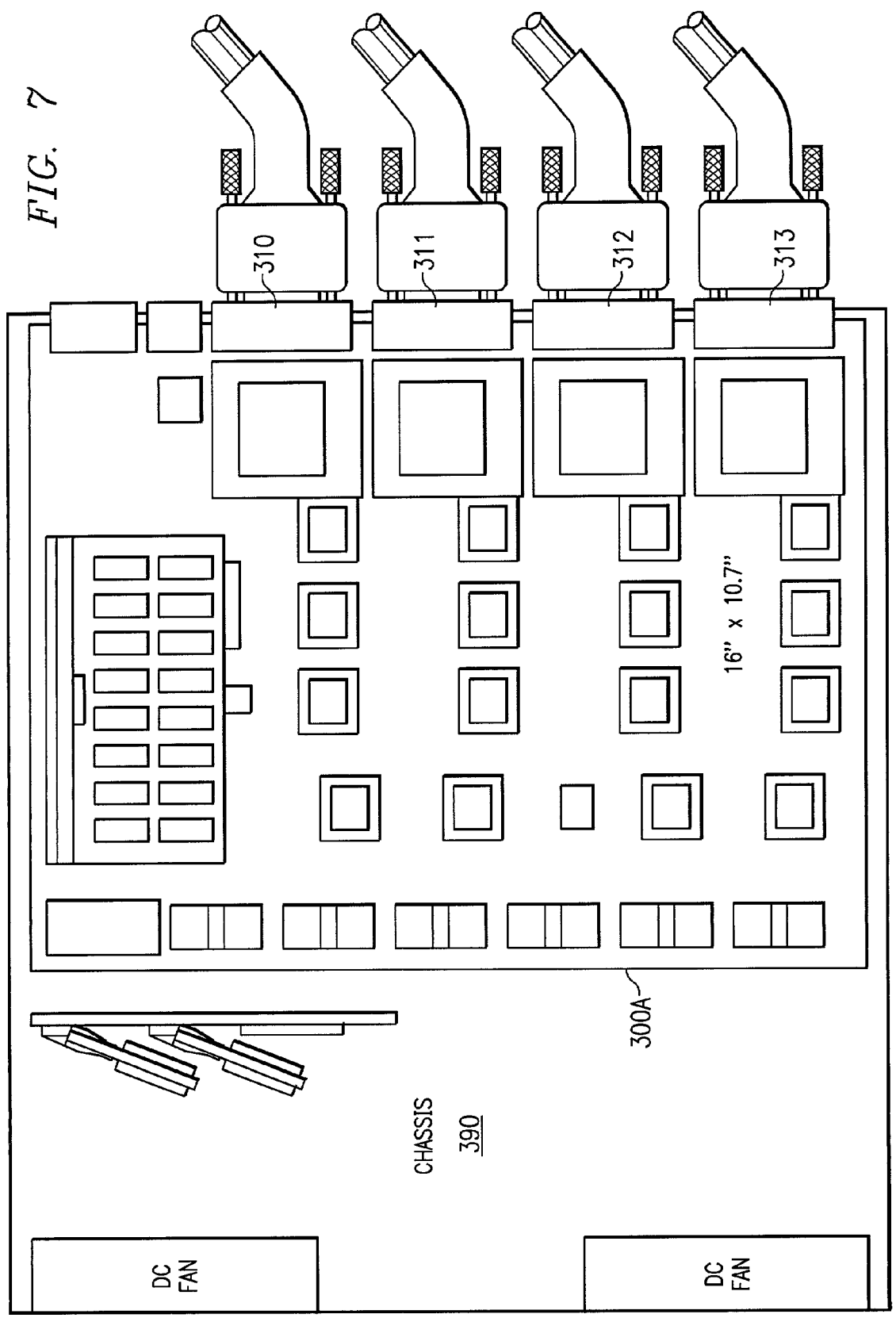

FOLDED FABRIC SWITCHING ARCHITECTURE

This application claims priority to U.S. Provisional Application No. 60/223,675 filed Aug. 8, 2000 entitled, "High Speed Data Switching Fabric Architecture and Methods."

TECHNICAL FIELD OF THE INVENTION

The present invention relates to input/output systems and, in particular, to a system and method for providing a printed circuit board switching fabric for enabling communication paths between multiple input/output ports of a printed circuit board.

BACKGROUND OF THE INVENTION

The increasing pervasiveness of the Internet is straining information technology manufacturer's and service provider's capabilities to meet market demands for increasingly higher bandwidth, processor intensive services. Great advances have been implemented in the delivery networks, for example backbone capacities and intra-network delivery capacities. Intensive research efforts promise to continue the advances in network delivery capabilities. The widespread implementation of fiber optic carriers is one example of the industry response to increasing demands placed on the current information system infrastructures.

Improvements in semiconductor manufacture techniques are providing advances in microprocessor computational capabilities on par with the technological progress being made in delivery networks. The well known Moore's law succinctly summarizes the commercial pressure processor manufactures labor under.

The Internet, and the massive data infrastructures being propagated thereby, is producing an increasing reliance on distributed and parallel processing capabilities. While the processing and delivery capabilities of the carrier networks are, in general, satisfying current demands, a specific technological area that appears to be lagging in performance requirements is the input/output (I/O) capabilities of these distributed systems. Typical performance bottlenecks are often unrelated to the transport network capacities and processor node capacities but rather relate to the input/output systems. Shared bus input/output systems common in today's information technology infrastructures are often overwhelmed by the demands placed on them.

Recently the deficiencies of current input/output devices and standards have become the focus of research and development by a number of corporations. The dramatic performance increases recently observed in backbone networks, for example T3 and OC3, and transport network infrastructures have been notably diverging from advances in local network capabilities, for example Ethernet. Likewise, advances in system level interfacing technologies, for example SCSI, are lagging behind progress of transport capacities.

Various standards have been introduced, with varying levels of market acceptance, over the years to improve system interfacing and input/output performance. One of the more successful peripheral interconnection standards is the peripheral component interconnect (PCI) standard introduced by Intel. PCI proved far superior than the previous common standard, the VESA local bus. However, with backbones currently surpassing GB/s transmissions, systems interfacing thereto are failing to adequately handle these high bandwidths resulting in input/output bottlenecks at processing nodes receiving information therefrom. Consequently, data intensive systems, for example Internet servers providing information services to massive numbers of users, are becoming increasingly distributed and require further sophistication of the input/output systems.

Shared bus technologies effectively address input/output requirements for standalone computing and networking on a limited basis. However, the plethora of interfacing on typical PCs in networking environments strains the capabilities of common bus technologies. Clearly, the scale of networking found today was not considered when many of the common bussing architectures were being developed. Furthermore, as new standards are implemented to exploit the increasingly efficient transport networks, system scalability becomes even more complex. Increasing scalability often results in a corresponding decrease in bus performance because the efficiency of shared bus technologies decreases in proportion to the number of devices supported thereby.

Typical switching systems for interfacing various communication protocol mediums employ a backplane with add on cards for each I/O channel. In relatively small switching systems, for example eight port switching systems, the cost of the printed circuit boards can be a significant percentage of the total switch cost. Furthermore, as the demands for improved performance increase and the overall scalability of information systems increases, the demand for increased system miniaturization likewise increases. Configuring numerous ports around a central switching fabric presents numerous challenges in itself. For instance, signal traces need to be kept to a minimum length to preserve signal integrity and device-to-device timing. Furthermore, most chassis' are designed for all peripheral connections to be made on a common plane. Thus, having ports on two or more sides of the switching fabric is typically undesirable.

Therefore, it may be seen from the foregoing that a solution for providing a reduction in the overall size and the number of printed circuit boards required in a switched I/O system is desired.

SUMMARY OF THE INVENTION

In an embodiment of the present invention, an optimal printed circuit board input/output switching system is provided. The switching system includes a printed circuit board having multiple input/output ports with communication channels coupling the input/output ports to a switching fabric located on the printed circuit board. In another embodiment, two printed circuit boards may be connected with a board connector for providing switching between input/output ports of the printed circuit boards in a dual-board switching system. The switching fabrics of each printed circuit board can function as an aggregate switching fabric to provide communication channel switching between the input/output ports of the two printed circuit boards. In another embodiment, the dual-board switching system may include a single printed circuit board having the switching fabric located thereon. Communication channel switching between the input/output ports of both of the printed circuit boards is performed by the switching fabric located on the printed circuit board. Communication channel switching between ports on the board not including the switching fabric and between ports of both boards is enabled by an inter-board communication connection. The board connector also facilitates modification of the switching configuration. Connection of the two circuit boards provides a coplanar arrangement of the input/output ports of the printed circuit boards providing access to the input/output ports from a common plane of a switching system chassis.

BRIEF DESCRIPTION OF THE DRAWINGS

A more complete understanding of the method and apparatus of the present invention may be had by reference to the following detailed description when taken in conjunction with the accompanying drawings wherein:

FIG. 3 is an upper view of two printed circuit boards, each having a switching fabric, illustrating the general functionality of an embodiment of the present invention;

FIGS. 4A and 4B are, respectively, a side view and an upper view of a folded switch fabric device according to the teachings of the present invention;

FIG. 5 is a side view of a folded switch fabric device mounted within a switching system chassis according to an embodiment of the present invention;

FIG. 6 is a back view of a switching system chassis having a folded switch fabric device of the present invention mounted therein;

FIG. 7 is a top view of a single printed circuit board removed from a folded switch fabric device mounted within a switching system chassis according to an embodiment of the present invention.

DETAILED DESCRIPTION OF THE DRAWINGS

The preferred embodiment of the present invention and its advantages are best understood by referring to FIGS. 1–7 of the drawings, like numerals being used for like and corresponding parts of the various drawings.

Figure 1:
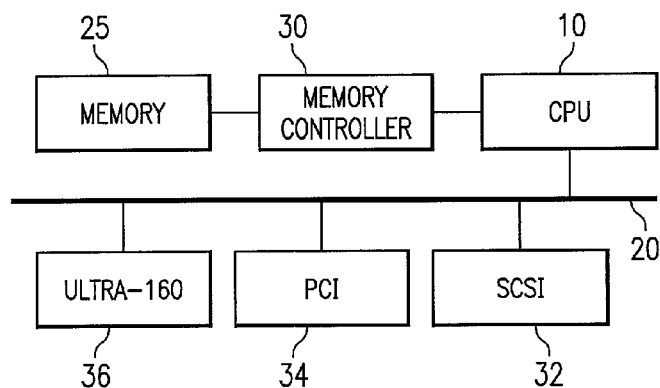
FIG. 1 is a prior art shared bus interface commonly used in information system infrastructures.

In FIG. 1, there is illustrated a typical shared bus interface typically found in today's information system infrastructures. A processing node 10 has an input/output bus 20 interfacing to various input/output adapters, for example a SCSI adapter 32, a PCI adapter 34 and a ultra-160 adapter 36. Each of the input/output adapters interface with the processing node 10 through the bus 20 to the processing node's memory 25 and memory controller 30, thus requiring independent administration capabilities, for example appropriate device drivers, for each individual adapter. Clearly, this strategy becomes more cumbersome as the number of technologies and corresponding adapters increases. The most common strategy for scaling such system is generally addressed by the brute force technique off adding additional busses.

It is apparent that a switched fabric capable of interfacing a processing node with various external devices over different physical communication channels would be advantageous. By moving input/output adaptation from the individual processing nodes to the network itself, administration and maintenance functions could be performed on a system, rather than node, wide basis. Furthermore, the processing overhead for each node would be greatly reduced with the extraction of the interfacing managerial function removed from each node. Numerous other advantages resulting by the realization of a centralized interface would be had. For example, scalability would be greatly simplified and could more effectively accommodate hot-plug capabilities. Numerous other advantages will be recognized by those skilled in the art.

As mentioned hereinabove, significant research and development efforts are being expended in developing switched fabrics for realizing dramatic improvements over shared bus architectures. A switched fabric architecture will provide numerous advantages over prior art shared bus technologies. The present invention exploits some of the advantages that are inherent in switched fabrics to provide a novel folded fabric architecture that yields considerably smaller switching system profiles and consequent reductions in manufacturing costs associated therewith.

Figure 2:
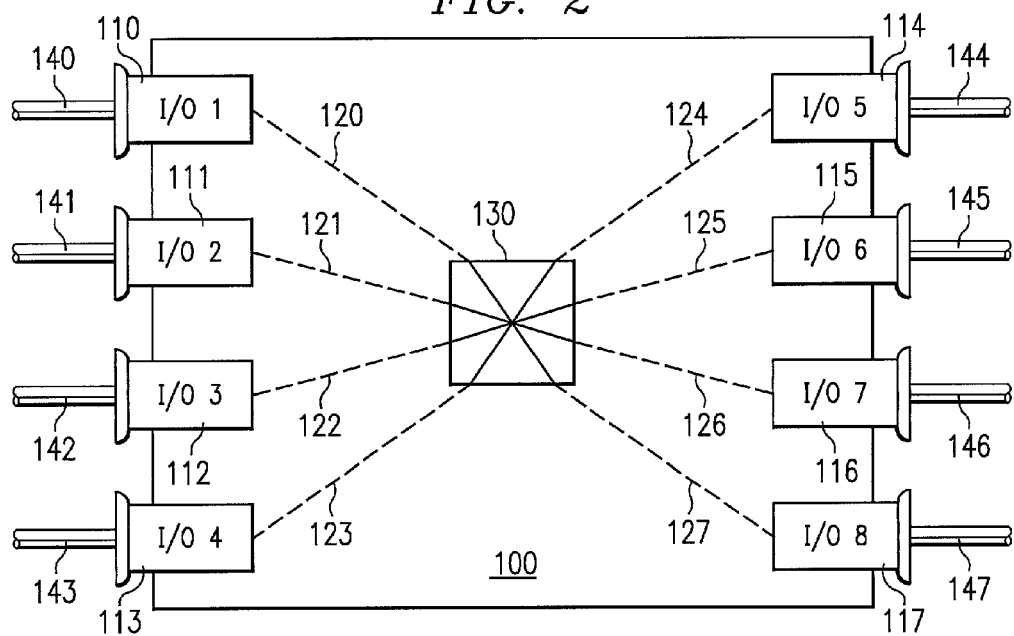
FIG. 2 is an upper view of a printed circuit board having a centralized switching fabric for establishing a communication path between input/output ports of the printed circuit board.

The present invention incorporates a printed circuit board switched fabric capable of having numerous disparate I/Os embodied as ports on the printed circuit board. In FIG. 2, there is illustrated a simplified printed circuit board 100 having four ports 110–113 located on an edge thereof and four I/O ports 114–117 located on the same surface of the printed circuit board 100 and on an opposing edge thereof. A central switching fabric 130 is located between the banks of I/O ports 110–113 and I/O ports 114–117. Each of the I/O ports 110–113 has a respective communication channel 120–123 coupled to the switching fabric 130. Similarly, each of the I/O ports 114–117 has a respective communication channel 124–127 coupled to the switching fabric 130. It should be understood that, while each of the communication channels 120–127 is illustrated as a single physical channel (illustratively represented by a dashed line), this illustration is for simplification only. Each channel illustrated may include a plurality of physical channels to provide both read and writes to and from the I/O ports with respect to the switching fabric. Preferably, each of the communication channels 120–127 is comprised of multiple signal traces on the printed circuit board 100 surface. Communication channels 120–127 accordingly provide input and output communication paths for transfers of data between the switching fabric 130 and respective input/output ports 110–117. Accordingly, the switching fabric 130 may provide switching functions for channeling data from any of the I/O ports 110–117 to any other I/O port 110–117. Thus, data received over the communication cable 140 connected to the I/O port 110, for example, and transferred to the switching fabric 130 over the communication channel 120 may be routed over any of the other communication channels 121–127 to the respective port 111–127 for transfer over the associated communication cable 141–147. It should also be understood that the number of ports illustrated and described with reference to the printed circuit board 100, and in the following description of the embodiments of the invention, is arbitrarily chosen for illustrative purposes and in no manner limits the invention to like configurations.

A switch configuration as illustrated in FIG. 2 is generally undesirable. It is typically advantageous to have a switching configuration where all of the ports may extend from a common surface of the switching chassis. This is clearly not possible with the arrangement of I/O ports 110–113 placed on an opposing edge with respect to the I/O ports 114–117. Prior art techniques satisfy this general requirement by embodying the switching fabric in a backplane having multiple interface slots for respectively receiving additional printed circuit boards, often referred to as plug-in boards, therein. Each plug-in card includes a single I/O port. Thus, to realize the switching functionality of the printed circuit board 100, the typical prior art solution would require nine individual printed circuit boards— one printed circuit board including the switching fabric embodied as a backplane and eight individual I/O plug-in boards interfaced therewith.

The present invention provides a novel switching fabric configuration that consumes a smaller chassis volume than prior art solutions thus resulting in the ability to reduce the switch chassis size. Furthermore, the manufacturing costs associated with the present invention are generally less than those of comparably functional prior art switches due the reduction in the required number of printed circuit boards and the reduction in the switching system chassis size. In FIG. 3, there is illustrated a novel switching fabric configuration incorporating two printed circuit boards 200A and 200B each respectively having a bank of I/O ports 210–213 and 214–217. Each of the printed circuit boards 200A and 200B respectively has a switching fabric 230A and 230B. Switching fabric 230A provides a communication path between any of the I/O ports 210–213 over a respective communication channel 220–223. Similarly, switching fabric 230B provides a communication path between any of the I/O ports 214–217 over a respective communication channel 224–227. Accordingly, data received over any of the communication cables 240–243 may be respectively transferred over a communication channel 220–223 to the switching fabric 230A. The switching fabric 230A may then provide a communication path to any of the other communication channels 220–223 of the printed circuit board 200A for transfer over the corresponding communication cable 240–243. Likewise, data received over any of the communication cables 244–247 may be respectively transferred over a communication channel 224–227 to the switching fabric 230B. The switching fabric 230B may then provide a communication path to any of the other communication channels 224–227 of the printed circuit board 200B for transfer over the corresponding communication cable 244–247.

To provide communication from an I/O port of the bank of I/O ports 210–213 of the printed circuit board 200A to an I/O port 214–217 of the bank of I/O ports on the printed circuit board 200B, a board connector 260 is coupled to both of the printed circuit boards 200A and 200B. Each of the printed circuit boards 200A and 200B has a respective interboard communication channel 250A and 250B coupled to the corresponding switching fabric 230A and 230B and the board connector 260. By including a board connector 260, the switching fabrics 230A and 230B may collaboratively establish communication paths between any of the I/O ports 210–213 of a first bank of I/O ports and any of the I/O ports 214–217 of the opposing bank of I/O ports. Thus, communications may be transferred from any I/O port 210–217 to any other I/O port 210–217. In such a scenario, the two switching fabrics 230A and 230B together function as an aggregate switching fabric for providing switching between any of the I/O ports 210–213 and any of the I/O ports 214–217.

In FIG. 4A, there is illustrated a side view of a folded fabric switching device 300 that includes two printed circuits boards 300A and 300B according to an embodiment of the present invention. The functionality of the printed circuit boards 300A and 300B generally corresponds to that of the printed circuit boards, and the components thereon, as described in FIG. 3. The novel configuration of the printed circuit boards 300A and 300B is had by 'folding' the printed circuit boards 300A and 300B about the board connector 360 such that the printed circuit boards are parallel and non-coplanar. In this manner, each of the I/O ports 310–317 may lie in a common plane such that they are locatable on a common panel of a switching system chassis.

Each of the printed circuit boards 300A and 300B includes a respective switching fabric 330A and 330B to which data transfers may be made from the associated groups of I/O ports 310–313 and 314–317. A board connector 360 is mounted to each of the printed circuit boards 300A and 300B on a surface opposing the respective side on which the switching fabric 330A and 330B is mounted. The interboard communication channels 350A and 350B facilitate data transfers to and from the printed circuit boards 300A and 300B via the board connector 360. The interboard communication channels 350A and 350B may be embodied in various forms including, but not limited to, conductive pins, communication cabling or holes having a conductive coating on the respective printed circuit boards 300A and 300B. Furthermore, the board connector 360 may be connected to the printed circuit boards and coupled to the communication channels 350A and 350B according to various well known methods. For example the board connector 360 may be coupled to the printed circuit boards 300A and 300B by thru-hole connections, surface mount techniques and tape automated bonding procedures. Alternatively, the board connector 360 may be embodied as a simple male-female connector that provides a digital communication path between the printed circuit boards 300A and 300B. When the board connector 360 is embodied as a male-female connector, additional advantages may be had as described more fully hereinbelow with reference to FIG. 7. The combination of the printed circuit boards 300A and 300B including the board connector 360 and I/O ports 310–317, as well as the respective switching fabrics 330A and 330B, is collectively referred to herein as a folded fabric switching device.

In FIG. 4B, there is illustrated a front view of the folded fabric switching device 300. I/O ports 310–313 on the printed circuit board 300A are connected to the switching fabric 330A via respective communication channels 320–323. The board connector 360 provides a communication medium facilitating communications between any one of the I/O ports 310–313 on the printed circuit board 300A with any of the I/O ports 314–317 on the printed circuit board 300B. It should be clear from FIGS. 4A and 4B that the printed circuit boards 300A and 300B may be identically fabricated.

In FIG. 5, there is illustrated a side view of a system chassis 390 housing various electronic equipment, for example a DC fan 370 as well as a power supply 395. Generally, the system chassis 390 will contain at least one primary system motherboard that includes various sockets and interfaces for accepting additional expansion, or plug-in, boards. As mentioned above, prior art switching systems typically employ a single backplane board that includes the switching fabric and individual plug-in cards connected to the backplane for adding I/O channels thereto. The present invention minimizes the number of printed circuit boards contained within the chassis 390. Mounted within the chassis 390 is a folded fabric switching device 300 that includes printed circuit boards 300A and 300B mutually coupled to the board connector 360. Each of the printed circuit boards 300A and 300B respectively include a switching fabric 330A and 330B mounted on a respective surface opposing the board connector 360. Each of the printed circuit boards 300A and 300B has a respective bank of I/O ports 310–313 and 314–317 mounted thereto. Data may be transferred to and from any of the I/O ports 310–317 as described hereinabove. In addition to the reduction in the number of printed circuit boards required respective to comparably functional prior art switching devices, additional advantages are had by the present invention. As illustrated in FIG. 5, all of the I/O ports may be commonly located on a single plane, for example at a back panel, of the chassis. Additionally, back pressure on the cooling fan 370 is reduced. In typical prior art devices where numerous plug-in cards are required, the air flow generated by the cooling fan is required to be redirected through the rows of plug-in cards. Because the present invention provides, in the present illustrative example, eight port switching realized on two parallel printed circuit boards 300A and 300B, air flow through the chassis 390 is maintained substantially linear. The reduction in back pressure results in an increased fan 370 efficiency. Consequently, a lower power fan 370 may be used when a folded fabric switching device 300 is used in the switching system chassis 390.

By manufacturing the printed circuit boards 300A and 300B with the majority of active components on respective outer surfaces of the folded fabric switching device 300, that is on surfaces 301A and 302A of respective printed circuit boards 300A and 300B (shown in FIG. 4A), the cooling effect of the fan 370 can be further increased. By utilizing the outer surfaces 301A and 302A of the printed circuit boards 300A and 300B for active component mounting and using the inner surfaces 301B and 302B primarily for passive component mounting, the main source of heat generation, i.e. the active components, will be maintained within the airflow thus providing a greater cooling effect for those components relative to the components on the inner surfaces 301B and 302B. This mounting scheme is preferred due to the air damn effect created by the board connector 360. The board connector 360 blocks some of the airflow from the fan 370 and forces it over the outer surfaces 301A and 302A of the printed circuit boards 300A and 300B. By mounting the majority of the active components on the outer surfaces 301A and 302A of the printed circuit board, the air damn effect caused by the board connector 360 is advantageously exploited.

In FIG. 6, there is illustrated a rear view of a system chassis 390 capable of housing various electronic equipment and a folded switch fabric device 300 of the present invention. From the back view of the chassis 390, the coplanar arrangement of the I/O ports 310–317 is discernable. The collinear arrangement of I/O ports 310–313 mounted on the printed circuit board 300A are located in a common plane with the collinear arrangement of I/O ports 314–317. Thus, the I/O ports 310–317 of the present invention are accessible from a common side of the system chassis 390. Numerous exhaust holes 385 surround the I/O ports 310–317 and provide a convenient technique for modifying the cooling effect provided by the fan 370. By adding or subtracting, for example unplugging or plugging, various holes 385 the airflow can be tailored to the cooling required by the folded switch fabric device 300.

In FIG. 7, there is illustrated a top view of a printed circuit board 300A according to another embodiment of the present invention. As aforementioned, the board connector 360 may be embodied as a male-female connector. When the board connector 360 is embodied as a male-female connector, the printed circuit boards 300A and 300B may be disconnected by simply decoupling the male-female adapters of the board connector 360. Either printed circuit board, for example printed circuit board 300B, may then be removed from the chassis 390. In the present example, by removing the printed circuit board 300B, only the I/O ports 310–313 remain within the switching system chassis 390. Thus, the number of ports in the switching configuration is easily variable when the board connector 360 is embodied as a male-female connector. It should be apparent that after decoupling the printed circuit boards 300A and 300B, both boards may be left within the chassis 390. In this example, two 4-port switching configurations would result. Numerous other rearrangements of the present invention should be apparent to those skilled in the art. For example, the illustrations and accompanying description have all set forth printed circuit boards having four I/O ports. Any number of I/O ports can be accommodated on the printed circuit boards of the folded fabric switching device 300. Furthermore, combinations of printed circuit boards of differing sizes can easily be accommodated by the teachings herein. Thus, printed circuit boards having different numbers of I/O ports can be combined in various combinations to provide an equally various number of combinations of porting configurations.

Figure 8:
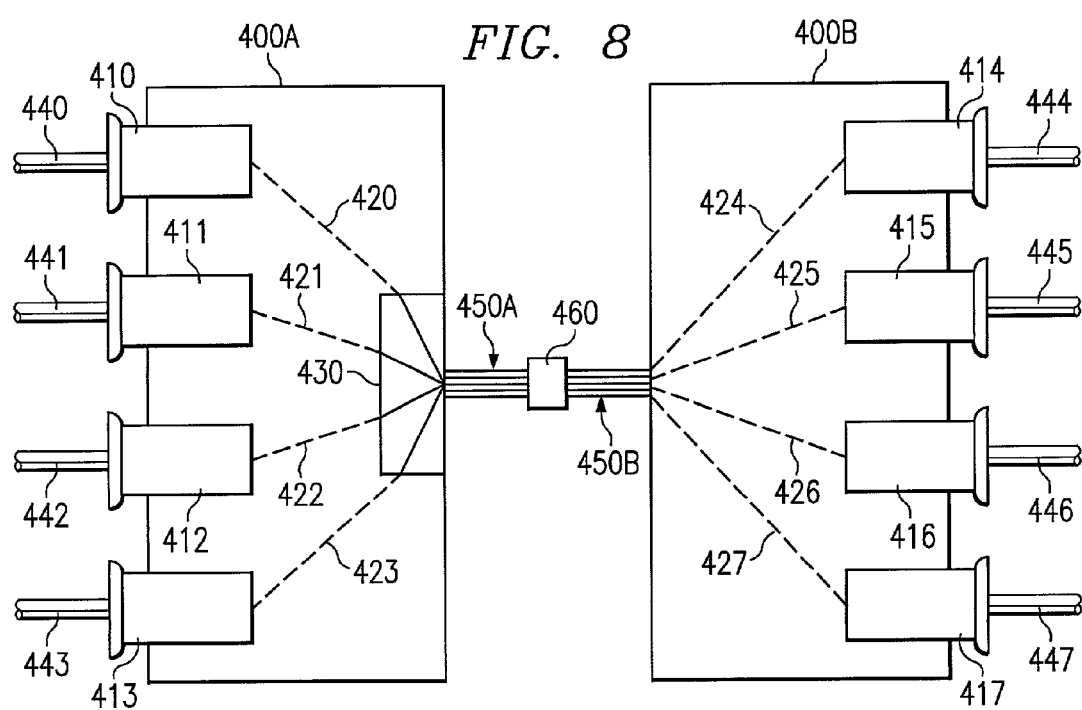
FIG. 8 is an upper view of two printed circuit boards with a switching fabric isolated on a single printed circuit board according to an embodiment of the present invention.

In an alternative embodiment of the present invention illustrated in FIG. 8, there is illustrated a switching fabric configuration incorporating two printed circuit boards 400A and 400B each respectively having a bank of I/O ports 410–413 and 414–417. In this particular embodiment, only one printed circuit board 400A includes a switching fabric 430. The switching fabric 430 provides a communication path between any of the I/O ports 410–413 over a respective communication channel 420–423. Because the printed circuit board 400B does not have a switching fabric, a communication path between any of the I/O ports 414–417 over a respective communication channel 424–427 is provided by the switching fabric 430 via an interboard communication channel 450A and 450B coupled to the corresponding switching fabric 430 and the board connector 460. Accordingly, data received over any of the communication cables 440–443 may be respectively transferred over a communication channel 420–423 to the switching fabric 430. The switching fabric 430 may then provide a communication path to any of the other communication channels 420–423 of the printed circuit board 400A for transfer over the corresponding communication cable 440–443. Likewise, data received over any of the communication cables 444–447 may be respectively transferred over a communication channel 424–427 to the switching fabric 430 via the interboard communication channels 450A and 450B coupled to the corresponding switching fabric 430 and the board connector 460. The switching fabric 430 may then provide a communication path to any of the other communication channels 424–427 of the printed circuit board 400B for transfer over the corresponding communication cable 444–447.

To provide communications from an I/O port of the bank of I/O ports 410–413 of the printed circuit board 400A to an I/O port 414–417 of the bank of I/O ports on the printed circuit board 400B, a board connector 460 is coupled to both of the printed circuit boards 400A and 400B. Each of the printed circuit boards 400A and 400B has a respective interboard communication channel 450A and 450B coupled to the corresponding switching fabric 430 and the board connector 460. By including a board connector 460, the switching fabric 430 may establish communication paths between any of the I/O ports 410–413 of a first bank of I/O ports and any of the I/O ports 414–417 of the opposing bank of I/O ports. Thus, communications may be transferred from any I/O port 410–417 to any other I/O port 410–417.

Although one or more embodiments of the method and apparatus of the present invention has been illustrated in the accompanying drawings and described above, it will be understood that the invention is not limited to the embodiment disclosed, but is capable of numerous rearrangements, modifications and substitutions without departing from the spirit of the invention as set forth and defined by the following claims.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A switching device for establishing communication paths between at least a first and second input/output port, said device comprising:
   a first printed circuit board having a first plurality of input/output ports connected thereto;
   a first switching fabric respectively connected by a first plurality of communication channels to each of the first plurality of input/output ports;
   a second printed circuit board having a second plurality of input/output ports connected thereto;
   a second switching fabric respectively connected by a second plurality of communication channels to each of the second plurality of input/output ports; and
   an electrical connector removeably connectable to the first and second printed circuit boards and operable to provide electrical communications therebetween, the first and second plurality of output ports being mutually oriented in a common direction.

2. The switching device according to claim 1, wherein the first and second switching fabrics are operable to transfer electrical signals therebetween when the electrical connector is connected to the first and second printed circuit boards.

3. The switching device according to claim 1, wherein the electrical connector comprises a male-female electrical connector.

4. The switching device according to claim 1, wherein the first and second switching fabrics are respectively operable to establish electrical communication paths between any of the first plurality of input/output ports and the second plurality of input/output ports.

5. The switching device according to claim 1, wherein the first and second switching fabrics are collaboratively operable to establish electrical communication paths between any of the first plurality of input/output ports and any of the second plurality of input/output ports when the electrical connector is connected to the first and second printed circuit boards.

6. The switching device according to claim 1, wherein each channel of the first and second plurality of communication channels respectively comprise at least one signal trace.

7. The switching device according to claim 5, wherein the first printed circuit board is connected to a first side of the electrical connector and the second printed circuit board is connected to a second side of the electrical connector, the first and second sides of the electrical connector being significantly parallel.

8. The switching device according to claim 7, wherein the first printed circuit board has a majority of active electronic components mounted on a first surface thereof, the second printed circuit board has a majority of active electronic components mounted on a first surface thereof, the first surface of the first printed circuit board and the first surface of the second printed circuit board oriented in opposing directions.

9. A method for establishing communication paths between a first input/output port of a first printed circuit board and a second input/output port, said method comprising the steps of:
   receiving, on a communication cable, an electrical signal at the first input/output port;
   transmitting, on a first communication channel connected to the first input/output port, the electrical signal to a first switching fabric on the first printed circuit board;
   establishing a communication path between the first communication channel and a second communication channel by the first switching fabric;
   transmitting, on the second communication channel, the electrical signal to the second input/output port,
   wherein:
   the second input/output port is connected to a second printed circuit board; and said step of establishing further comprising the steps of;
      providing a connection to an electrical connector by said first switching fabric, the electrical connector connected to the first printed circuit board and the second printed circuit board;
      transmitting, by said first switching fabric, the electrical signal to the second switching fabric trough the electrical connector; and
      establishing, by the second switching fabric, a communication path between the second input/output port and the second switching fabric.

10. The method according to claim 9, wherein the second input/output port is connected to the first printed circuit board.

11. The method according to claim 9, wherein the first and second communication channels respectively comprise at least one signal trace.

12. The method according to claim 9, wherein the electrical connector comprises a male-female electrical connector.

13. The method according to claim 9, wherein the first printed circuit board and the second printed circuit board are respectively connected to opposing surfaces of the electrical connector, the first and second printed circuit boards being oriented substantially in parallel.

14. A switching device for establishing communication paths between at least a first and second input/output port, said device comprising:
   a first printed circuit board having a first plurality of input/output ports connected thereto;
   a switching fabric respectively connected by a first plurality of communication channels to each of the first plurality of input/output ports, the switching fabric located on the first printed circuit board;
   a second printed circuit board having a second plurality of input/output ports connected thereto; and
   an electrical connector removeably connectable to the first and second printed circuit boards and operable to provide electrical communications therebetween, the second plurality of input/output ports connectable to the electrical connector by a second plurality of communication channels.

15. The switching device according to claim 14, wherein the first and second plurality of output ports are mutually oriented in a common direction.

16. The switching device according to claim 14, wherein the switching fabric is operable to transfer electrical signals between any one of the first plurality of input/output ports and the second plurality of communication ports when the electrical connector is connected to the first and second printed circuit boards.

17. The switching device according to claim 14, wherein the electrical connector comprises a male-female electrical connector.

18. The switching device according to claim 14, wherein each channel of the first and second plurality of communication channels respectively comprise at least one signal trace.

19. The switching device according to claim 14, wherein the first printed circuit board is connected to a first side of the electrical connector and the second printed circuit board is connected to a second side of the electrical connector, the first and second sides of the electrical connector being significantly parallel.

20. The switching device according to claim 14, wherein the first printed circuit board has a majority of active electronic components mounted on a first surface thereof, the second printed circuit board has a majority of active electronic components mounted on a first surface thereof, the first surface of the first printed circuit board and the first surface of the second printed circuit board oriented in opposing directions.

* * * * *

UNITED STATES PATENT AND TRADEMARK OFFICE
CERTIFICATE OF CORRECTION

PATENT NO.     : 6,977,925 B2
DATED          : December 20, 2005
INVENTOR(S)    : David Allen Pittman It is certified that error appears in the above-identified patent and that said Letters Patent is hereby corrected as shown below:

Column 10,
Line 18, change "steps of;" to -- steps of: --.
Line 24, change "trough" to -- through --.

Signed and Sealed this

Twenty-first Day of February, 2006

JON W. DUDAS
*Director of the United States Patent and Trademark Office*